(12) United States Patent
Duncan et al.

(10) Patent No.: US 7,299,133 B2
(45) Date of Patent: Nov. 20, 2007

(54) DATA ACQUISITION UNIT, SYSTEM AND METHOD FOR GEOPHYSICAL DATA

(75) Inventors: Andrew Charles Duncan, Mundaring (AU); Howard Golden, Belmont (AU); John Douglas Tresidder, Leeming (AU)

(73) Assignee: WMC Resources Limited, Melbourne (AU)

( * ) Notice: Subject to any disclaimer, the term of this patent is extended or adjusted under 35 U.S.C. 154(b) by 0 days.

(21) Appl. No.: 10/518,062

(22) PCT Filed: Jun. 20, 2003

(86) PCT No.: PCT/AU03/00770

§ 371 (c)(1),
(2), (4) Date: Apr. 25, 2005

(87) PCT Pub. No.: WO04/001455

PCT Pub. Date: Dec. 31, 2003

(65) Prior Publication Data

US 2005/0177310 A1 Aug. 11, 2005

(30) Foreign Application Priority Data

Jun. 20, 2002 (AU) ..................... PS3068

(51) Int. Cl.
*G01V 1/00* (2006.01)
*G01S 5/14* (2006.01)
(52) U.S. Cl. .................. 702/14; 342/357.04
(58) Field of Classification Search .................. 702/14, 702/5, 17; 367/37, 38, 78, 56, 58; 324/350, 324/345; 701/213; 342/357.04, 357.06, 342/357.09, 357.12, 357.15
See application file for complete search history.

(56) References Cited

U.S. PATENT DOCUMENTS 5,724,241 A * 3/1998 Wood et al. .................. 702/14
6,188,962 B1 * 2/2001 Morgan et al. ............... 702/14

(Continued)

FOREIGN PATENT DOCUMENTS

EP    0 967 494 A2    12/1999

OTHER PUBLICATIONS

WO 00/00843, Seismic Data Acquisition and Method for Spatially Filtering Seismic Data, Publication Date: Jan. 6, 2000.

(Continued)

*Primary Examiner*—John Barlow
*Assistant Examiner*—Toan M. Le
(74) *Attorney, Agent, or Firm*—Rankin, Hill, Porter & Clark LLP (57) ABSTRACT

A data acquisition system for gathering geophysical data, a corresponding method, and a data acquisition unit for use with the system and method are disclosed. The system (10) comprises a plurality of data acquisition units (14) for gathering geophysical data, each data acquisition unit (14) being connectable to at least one sensor (15) and being arranged, during use, to gather geophysical data from the at least one sensor (15). Each data acquisition unit (14) comprises time referencing means (48) arranged to generate time reference data usable to control the time at which samples of geophysical data are taken. The system (10) further comprises means for calculating spatial derivatives between samples associated with adjacent sensors (15) connected during use to the data acquisition units (14).

62 Claims, 7 Drawing Sheets

U.S. PATENT DOCUMENTS 6,191,587 B1 * 2/2001 Fox .......................... 324/350
6,446,009 B1 * 9/2002 Baeten et al. ................. 702/17
6,801,473 B2 * 10/2004 Matteucci et al. ............ 367/47

OTHER PUBLICATIONS

WO 02/073237 A2, Seismic Processing Method to Improve Spatial Resolution, Publication Date: Sep. 19, 2002.

* cited by examiner

DATA ACQUISITION UNIT, SYSTEM AND METHOD FOR GEOPHYSICAL DATA

FIELD OF THE INVENTION

The present invention relates to a data acquisition unit, system and method for geophysical data and, in particular, to such a data acquisition unit, system and method for use in geophysical surveys arranged to measure electric and/or magnetic fields and generate survey data on the basis of the measured field.

BACKGROUND OF THE INVENTION

It is known to provide a data acquisition system which includes a plurality of networked data acquisition units, each data acquisition unit being connected to at least one sensor and being arranged to gather survey data from the sensors. The received survey data is passed via the network to a central computing device for processing. Synchronisation of the received survey data is also carried out via the network.

However, a disadvantage of this arrangement is that the gathered survey data often includes a significant amount of noise which can be of sufficiently large magnitude to obscure the desired signal response associated with a relatively deeply buried target.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

SUMMARY OF THE INVENTION

In accordance with a first aspect of the present invention, there is provided a data acquisition system for gathering geophysical data, said system comprising:

at least one data acquisition unit connectable to a plurality of sensors and being arranged, during use, to simultaneously gather geophysical data from the sensors, the or each data acquisition unit comprising time referencing means arranged to generate time reference data usable to control the time at which samples of geophysical data are taken; and means for calculating spatial derivatives between simultaneous samples associated with adjacent sensors connected during use to the at least one data acquisition unit so as to provide processed geophysical data with less noise.

Preferably, the time referencing means includes a GPS receiver. Alternatively or in addition, the time referencing means may include an accurate oscillator, preferably a precision oven controlled crystal oscillator, and a counter arranged to count signals generated by the oscillator.

In embodiments which include an oscillator, the data acquisition unit is preferably arranged to receive synchronisation signals useable by the processing means to adjust the frequency of the oscillator and adjust the times at which samples of geophysical data are taken so that the times at which samples of geophysical data are taken are synchronised with the times at which samples of geophysical data are taken in other data acquisition units.

Preferably, the data acquisition unit is arranged to receive programs and to store the programs in the data storage means for subsequent execution by the processing means.

Preferably, the data acquisition unit is arranged to calculate an average sample value for a plurality of corresponding repeat sample values when a plurality of data gathering operations are carried out as part of a geophysical survey so as to reduce the effect of interference on the samples and reduce the quantity of data. The data acquisition unit may be arranged to compare repeat samples and to discard samples which differ by a predetermined amount from the majority of the repeat samples.

Preferably, the data acquisition unit is arranged to calculate an average sample value for a plurality of consecutive samples taken during a data gathering operation carried out as part of a geophysical survey so as to produce a representative sample for the consecutive samples.

Preferably, the data acquisition unit is arranged to estimate the amount of interference present at a survey site. The amount of interference present may be estimated by carrying out a first data gathering operation with an incident magnetic field of a first polarity so as to produce a first response, carrying out a second data gathering operation with an incident magnetic field of a second polarity so as to produce a second response, and calculating the sum of the first and second responses so as to cause the first and second responses to cancel out.

Preferably, the data acquisition unit is arranged to filter gathered geophysical data so as to remove periodic interference.

Preferably, the data acquisition unit is arranged to convert gathered geophysical data into frequency domain using Fourier transform analysis.

Preferably, the data acquisition unit is arranged to generate a least one quality control indicator for use in assessing the quality of the gathered geophysical survey data.

Preferably, the data acquisition unit is arranged to calculate a standard deviation value for the gathered geophysical survey data.

Preferably, the data acquisition unit is arranged to adjust the level of gain applied to gathered geophysical survey data based on an assessment of the magnitude of the gathered geophysical survey data.

Preferably, the system is arranged to downward extrapolate gathered geophysical survey data so as to enhance detail of a target located below the surface of a survey area.

Preferably, the data acquisition unit is connectable to an energy source and the data acquisition unit is operable as an energy source control unit.

Preferably, the data acquisition unit includes at least one interface arranged to facilitate transfer of processed geophysical data and/or programs to or from the data acquisition unit. For this purpose, the interface may include an infra red interface, a serial interface and/or a network interface. The interface may be of a type which utilises wireless protocols, such as Bluetooth.

In embodiments which include an oscillator, a synchronisation interface may be provided for facilitating transfer of synchronisation signals to and/or from the data acquisition unit for the purpose of ensuring correct synchronisation of the oscillator with oscillators of other data acquisition units.

Preferably, the data acquisition unit includes display means, which may be an LCD display and/or an LED display, arranged to provide information to an operator as to whether operation of the data acquisition unit is satisfactory and/or whether the processed survey data is of sufficient quality for subsequent analysis. Such information may indicate whether there is a fault with the data acquisition unit or with a sensor connected to the data acquisition unit, or whether other conditions exist which necessitate operator action.

Preferably, the data acquisition unit is arranged to store a correction coefficient for each sensor connected during use to the data acquisition unit, each correction coefficient being used to correct for variations in sensor sensitivity.

Preferably, the data storage means is a FLASH memory. Additionally, a hard disk drive may be provided.

Preferably, the system includes a plurality of data acquisition units.

In one arrangement, the data acquisition unit includes the means for calculating spatial derivatives.

In an alternative arrangement, the means for calculating spatial derivatives is separate to the data acquisition unit. With this arrangement, the system may further comprise a portable computing device, the portable computing device including the means for calculating spatial derivatives.

Preferably, the system further comprises at least one reference data acquisition unit, each reference data acquisition unit being connectable to at least one reference sensor and being arranged, during use, to gather geophysical data from the at least one reference sensor, and to take samples of the geophysical data gathered from the sensors; wherein the means for calculating spatial derivatives between samples associated with adjacent sensors is arranged to calculate first spatial derivatives between at least some of the sensors connected to the data acquisition units and a reference sensor connected to the reference data acquisition unit during a first data gathering operation when the sensors are disposed in a first location, to calculate second spatial derivatives between at least some of the sensors connected to the data acquisition units and a reference sensor connected to the reference data acquisition unit during a second data gathering operation when the sensors are disposed in a second location, and to calculate a difference spatial derivative between the first and second spatial derivatives, each said difference spatial derivative being indicative of a spatial derivative between a sensor disposed in a first location and a sensor disposed in a second location.

Preferably, the system further comprises means for calculating an integral of the spatial derivatives so as to produce conventional geophysical data with less noise.

In one arrangement, the system also includes an energy source arranged to generate and direct energy towards the sub-surface volume so as to cause a geophysical response and thereby cause generation of the geophysical signals.

Preferably, the energy source includes a transmitter and a transmitter loop.

Preferably, the system is arranged to correct for variations in magnitude of the transmitter current during a geophysical survey. The system may be arranged to correct for a variation in magnitude of the transmitter current caused by a variation in power supplied to transmitter.

Preferably, the system also includes an energy source control unit connectable to the energy source and arranged to gather output data from the energy source, the energy source control unit including:

time referencing means arranged to generate time reference data usable to control the time at which gathering of the energy source output data occurs and to associate the energy source output data with the time reference data; and data storage means for storing the energy source output data.

Preferably, the energy source control unit is a transmitter control unit arranged to control a transmitter so as to energise a transmitter loop in accordance with a predetermined frequency.

Preferably, the energy source control unit includes the same components as the data acquisition unit so that the transmitter control unit is capable of carrying out the functions of the data acquisition unit and vice versa.

Preferably, the system is arranged to correct for variations in magnitude of the transmitter current during a geophysical survey. The system may be arranged to correct for a variation in magnitude of the transmitter current caused by a reduction in power supplied to the transmitter.

In accordance with a second aspect of the present invention, there is provided a method of acquiring geophysical data, said method including the steps of:

providing at least one data acquisition unit arranged to simultaneously gather geophysical data from a plurality of sensors connected in use to the at least one data acquisition unit;

connecting at least one geophysical sensor to the at least one data acquisition unit;

generating at the data acquisition unit time reference data usable to control the time at which gathering of samples of geophysical data are taken; and calculating spatial derivatives between simultaneous samples associated with adjacent sensors connected during use to the at least one data acquisition unit so as to produce processed geophysical data with less noise.

Preferably, the method further comprises the steps of:

providing at least one reference data acquisition unit arranged, during use, to gather geophysical data from the at least one reference sensor;

connecting each reference data acquisition unit to at least one reference sensor;

calculating first spatial derivatives between at least some of the sensors connected to the data acquisition units and a reference sensor connected to the reference data acquisition unit during a first data gathering operation when the sensors are disposed in a first location;

calculating second spatial derivatives between at least some of the sensors connected to the data acquisition units and a reference sensor connected to the reference data acquisition unit during a second data gathering operation when the sensors are disposed in a second location; and calculating a difference spatial derivative between the first and second spatial derivatives, each said difference spatial derivative being indicative of a spatial derivative between a sensor disposed in a first location and a sensor disposed in a second location.

Preferably, the method further comprises means for calculating an integral of the spatial derivatives so as to produce conventional geophysical data with less noise.

Preferably, the method further includes the step of correcting variations in the energy source using the reference data acquisition unit and associated reference sensor.

Preferably, the time referencing means includes a GPS receiver. Alternatively or in addition, the time referencing means may include an oscillator, preferably, a precision oven controlled crystal oscillator, and a counter arranged to count signals generated by oscillator.

In embodiments which include an oscillator, the method preferably includes the step of receiving at the data acquisition unit synchronisation signals useable by the processing means to adjust the frequency of the oscillator and thereby adjust the time at which gathering of geophysical data occurs so that the time at which gathering of geophysical data occurs is synchronised with the time at which gathering of geophysical data occurs in other data acquisition units.

Preferably, the method further comprises the step of calculating an average sample value for a plurality of corresponding repeat sample values when a plurality of data gathering operations are carried out as part of a geophysical survey so as to reduce the effect of interference on the samples and reduce the quantity of data.

Preferably, the method further comprises the step of comparing repeat sample values and discarding samples which differ by a predetermined amount from the majority of the repeat sample values.

Preferably, the method further comprising the step of calculating an average sample value for a plurality of consecutive samples taken during a data gathering operation carried out as part of a geophysical survey so as to produce a representative sample for the consecutive samples.

Preferably, the method further comprises the step of estimating the amount of interference present at a survey site. The amount of interference present may be estimated by carrying out a first data gathering operation with an incident magnetic field of a first polarity so as to produce a first response, carrying out a second data gathering operation with an incident magnetic field of a second polarity so as to produce a second response, and calculating the sum of the first and second responses so as to cause the first and second responses to cancel out.

Preferably, the method further comprises the step of filtering gathered geophysical data so as to remove periodic interference.

Preferably, the method further comprises the step of converting gathered geophysical data into frequency domain using Fourier transform analysis.

Preferably, the method further comprises the step of correcting for variations in magnitude of the energy source during a geophysical survey. The step of correcting for variations in magnitude may include the step of correcting for a variation in magnitude of the energy source caused by a variation in power supplied to the energy source.

Preferably, the method further comprises the step of generating a least one quality control indicator for use in assessing the quality of the gathered geophysical survey data.

Preferably, the method further comprises the step of calculating a standard deviation value for the gathered geophysical survey data.

Preferably, the method further comprises the step of adjusting the level of gain applied to gathered geophysical survey data based on an assessment of the magnitude of the gathered geophysical survey data.

Preferably, the method further comprises the step of downward extrapolating gathered geophysical survey data so as to enhance detail of a target located below the surface of a survey area.

Preferably, the method further includes the step of facilitating transfer of processed geophysical data and/or programs to or from the data acquisition unit. For this purpose, the interface may include an infra red interface, a serial interface and/or a network interface.

In embodiments which include an oscillator, the method may also include the step of facilitating transfer of synchronisation signals to and/or from the data acquisition unit for the purpose of ensuring correct synchronisation of the oscillator with oscillators of other data acquisition units.

Preferably, the method further includes the step of providing display means for providing information to an operator as to whether operation of the data acquisition unit is satisfactory and/or whether the time-stamped processed survey data is of sufficient quality for subsequent analysis. Said information may indicate whether there is a fault with the data acquisition unit or with a sensor connected to the data acquisition unit, or whether other conditions exist which necessitate operator action.

BRIEF DESCRIPTION OF THE DRAWINGS

The present invention will now be described, by way of example only, with reference to the accompanying drawings, in which.

DESCRIPTION OF A PREFERRED EMBODIMENT OF THE PRESENT INVENTION

Figure 1:
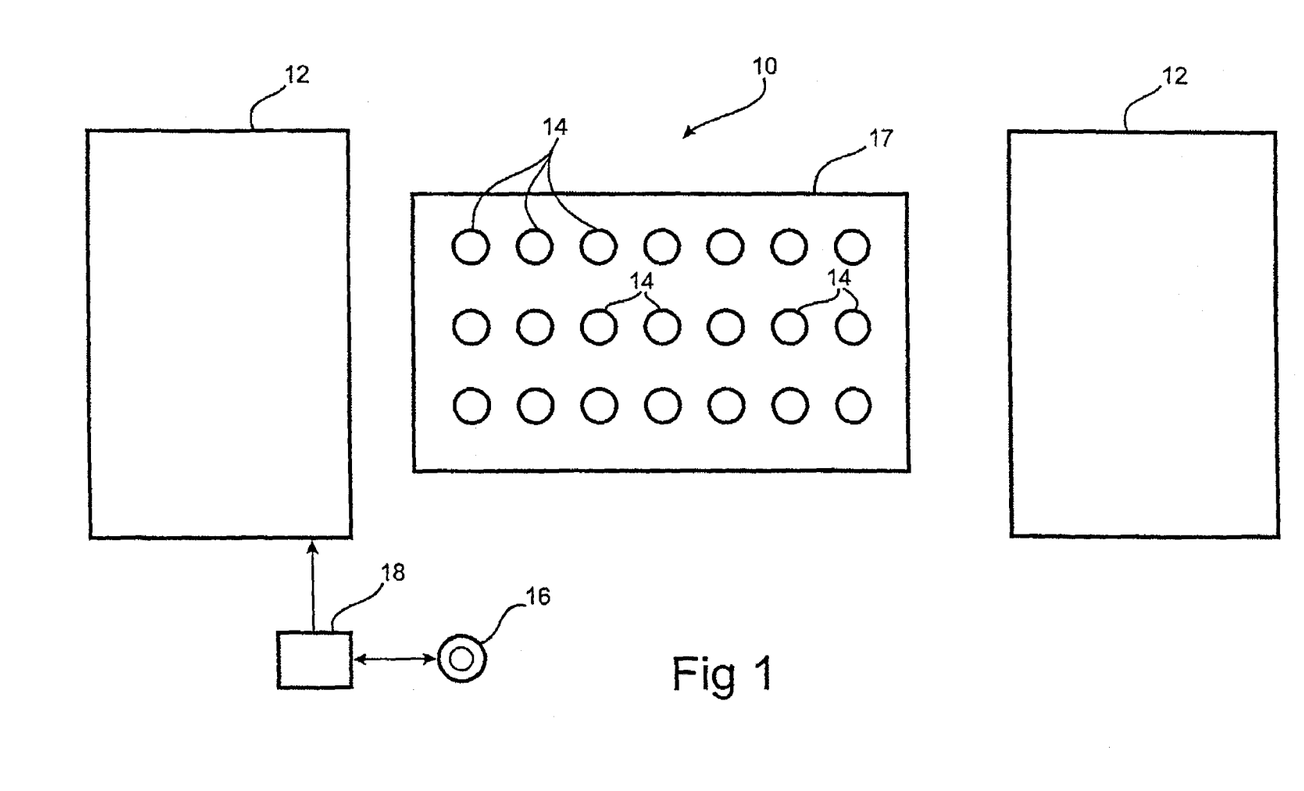
FIG. 1 is a block diagram of a data acquisition system in accordance with an embodiment of the present invention.

Referring to FIG. 1 of the drawings, there is shown a data acquisition system 10 for gathering geophysical data during a geophysical survey. In this example, the system 10 is a TEM (transient electromagnetics) type system arranged to generate and sense magnetic fields, although it will be understood that the invention is equally applicable to other geophysical surveys, such as geophysical surveys based on electric fields or seismic measurements, including MT (magneto-telluric) and IP (induced polarisation) type surveys.

Figure 2A:
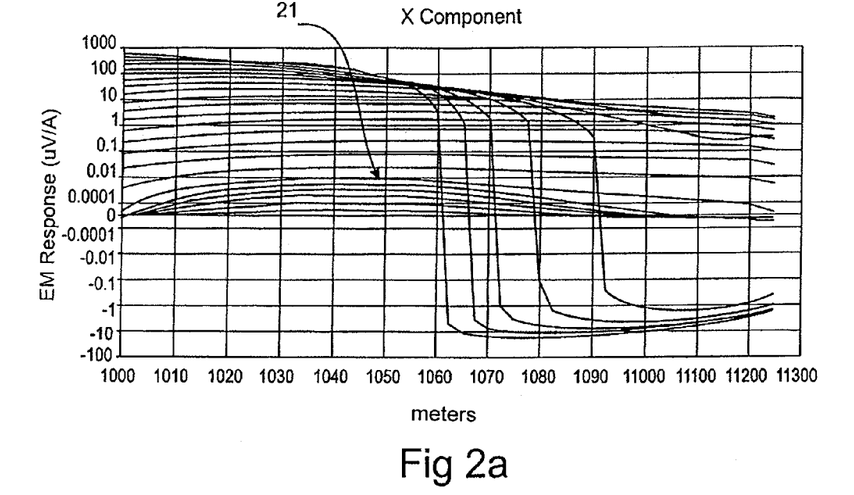
FIGS. 2a and 2b are plots of modelled fixed-loop TEM responses of a target for X and Z components respectively.
Figure 2B:
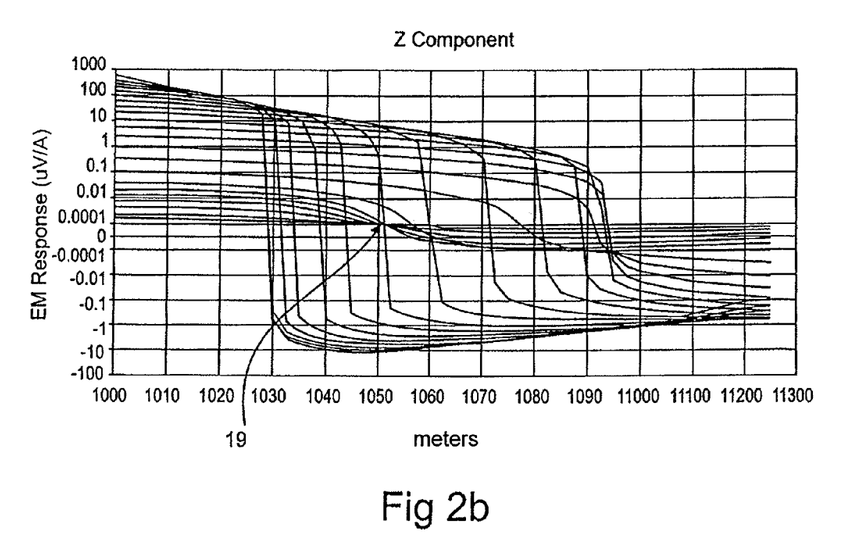

An example of responses obtained from a modelled fixed-loop TEM type survey for a conductive target disposed at a depth of the order of 500 m is shown in FIGS. 2a and 2b, where FIG. 2a shows a profile for an X component of a response and FIG. 2b shows a profile of a Z component of the response. The responses are displayed in units of microvolts per transmitter amp for coil sensors of effective area 10,000 sqm. At delay times greater than 250 mS, that is 250 mS after deactivation of the transmitter current, the target becomes identifiable as a polarity reversal 19 in the Z component and a peak 21 in the X component at a location approximately above the target. As can be seen, a target is not identifiable until the responses have decayed to around 10 nV/A. Accordingly, in order to detect such a target at a depth of the order of 500 m using a TEM type survey, the noise level associated with the system must be significantly less than 10 nV/A so that the response is not obscured by noise.

The system 10 includes a source of energy, in this example in the form of a pair of transmitter loops 12, each transmitter loop 12 generating a magnetic field when an electrical current passes through the loop 12. The magnetic field generated by a transmitter loop 12 passes into the earth's sub-surface and induces currents in electrically conductive components in the sub-surface which in turn generate electro-magnetic fields. The transmitter current is turned off after a predetermined period of time which causes the electro-magnetic fields to decay in magnitude over time. The decaying electro-magnetic fields are sensed by a plurality of data acquisition units 14 and associated sensors 15 disposed around the desired area 17 to be surveyed, and the sensed survey data is then sampled at a predetermined sampling rate so as to produce for each sensor samples of electro-magnetic field data which decrease in magnitude with each successive sample. The data samples are stored at the data acquisition unit 14. By analysing the data samples received at the data acquisition units 14, it is possible to obtain an indication as to the characteristics of the desired sub-surface volume. In practice, the transmitter loops 12 are energised one at a time and the response data from both transmitter loops is analysed to provide an indication as to the characteristics of the desired sub-surface volume.

In this example, the sensors 15 are coil-type sensors configured so as to measure a Z component, that is a generally vertical component, of an electro-magnetic field. Each coil has a passive coil area of the order of 350 sqm. It is possible to construct such a coil which has relatively low noise characteristics at frequencies of the order of 10 Hz.

The system 10 also includes an energy source control unit, in this example a transmitter control unit 16, and a transmitter 18, the transmitter control unit 16 being arranged to control the transmitter 18 so as to energise the transmitter loops 12 in accordance with a predetermined frequency. The transmitter control unit 16 also serves to sample the transmitter current at predetermined intervals corresponding to the sampling rate in the data acquisition units 14 and to store the transmitter current samples at the transmitter control unit 16. This may be facilitated in any suitable way, for example by disposing a shunt resistor in series with the transmitter current.

The data acquisition units 14 are each arranged to generate time reference data useable to control the times at which samples of the survey data are taken. Likewise, the transmitter control unit 16 is arranged to generate time reference data useable to control the times at which samples of the transmitter current are taken.

In this example, the transmitter control unit 16 and each data acquisition unit 14 include the same components and, as a consequence, the data acquisition units 14 are able to function as a transmitter control unit 16 and vice versa. For ease of reference, in the following description of embodiments of the invention, the data acquisition units 14 and the transmitter control unit 16 will be referred to as "nodes".

However, notwithstanding that the data acquisition units 14 and the transmitter control unit 16 in the following embodiments include the same components, it will be understood that this is not necessarily the case. As an alternative, the data acquisition units 14 and the transmitter control unit 16 may be configured so as to be dedicated to their respective tasks and, as a result, not interchangeable.

Figure 3:
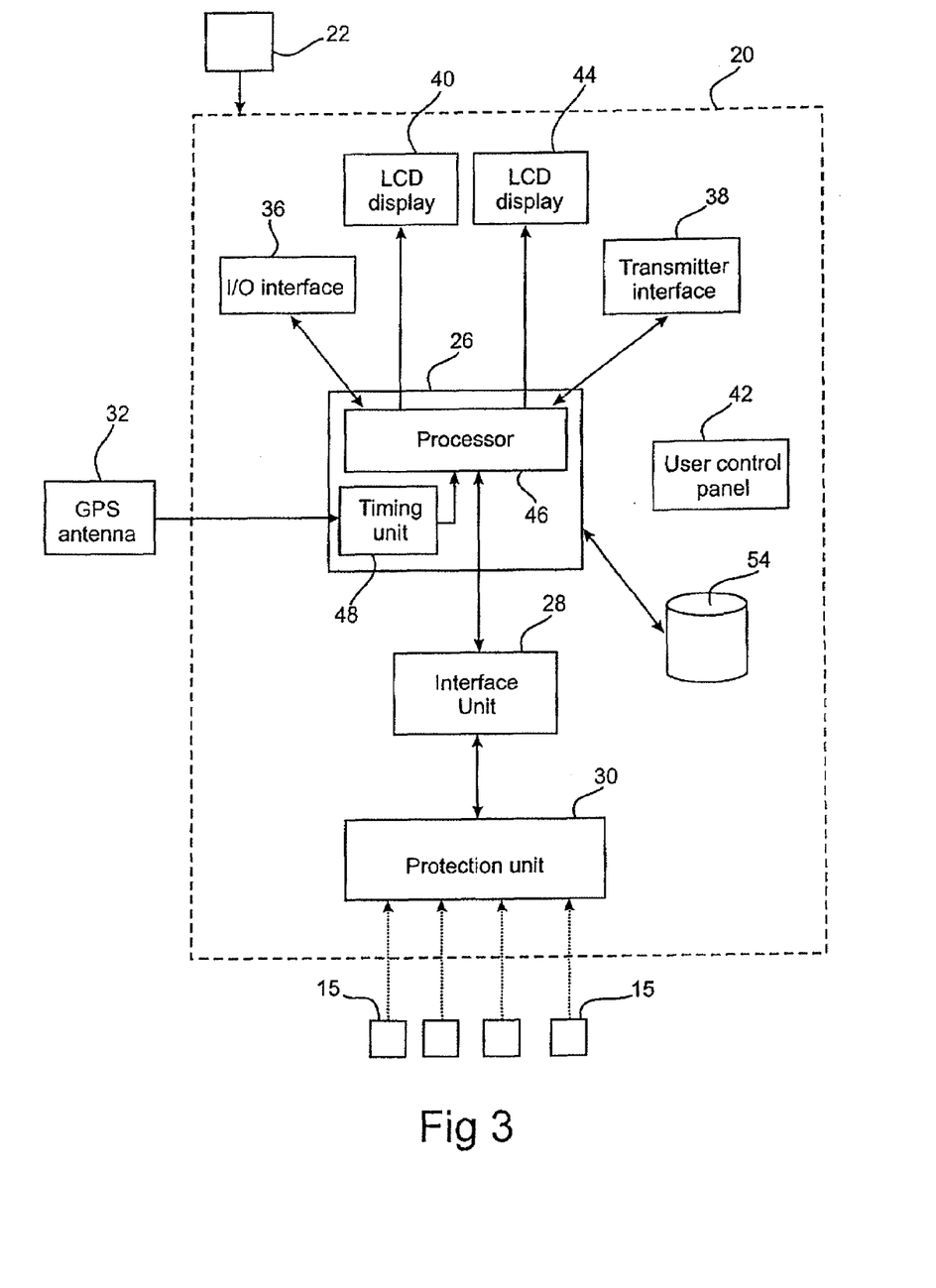
FIG. 3 is a block diagram of a data acquisition unit in accordance with an embodiment of the present invention.

The structure of a node 14, 16 is shown in FIG. 3.

Each of the nodes 14, 16 includes circuitry 20 and a power source, in this example in the form of a rechargeable battery 22. As an alternative, power may be supplied from an external power source.

The circuitry 20 includes a processing and control unit 26 for processing survey data received from sensors connected in use to the node when the node is used as a data acquisition unit 14, for processing transmitter current waveform data received from the transmitter 18 when the node is used as a transmitter control unit 16, and to control and coordinate operation of the node 14, 16. The circuitry 20 also includes an analogue interface unit 28 for interfacing between the processing and control unit 26 and sensors 15 or a transmitter 18 connected in use to the node 14, 16, and a circuit protection unit 30 for protecting the analogue interface unit 28 from damage which may occur as a result of large voltage transients from the sensors 15.

It will be understood that the type of sensors used will depend on the particular type of geophysical survey operation being carried out. In the present example, the survey is a TEM type survey and the sensors are coil-type sensors.

The circuitry 20 also includes an input/output interface 36 arranged to facilitate transfer of information between the node 14, 16 and a separate computing device or between two nodes 14, 16. In this example, the input-output interface 36 includes a serial interface for facilitating transfer of synchronisation signals to the nodes 14, 16 for the purpose of maintaining synchronisation of sample times, and an infra red interface for facilitating transfer of geophysical survey data or transmitter current data between the node 14, 16 and a separate computing device using infra red radiation. In this example, the infra red interface is an IrDA interface. The input/output interface may also include a network interface (not shown). The input/output interface may as an alternative be of a type which utilises wireless protocols, such as Bluetooth.

The circuitry 20 also includes a transmitter interface 38 for use when the node operates as a transmitter control unit 16. The transmitter interface 38 serves to transfer control instructions to the transmitter 18 and may also be used to transfer current waveform data from the transmitter 18 to the processing and control unit 26 for sampling.

The circuitry 20 also includes an LCD display 40 for displaying to a user information indicative of the status of operation of the node 14, 16, a user control panel 42 for facilitating direct entry of control instructions to the node 14, 16 by a user, and an LED display 44 which serves to indicate to a user the status of the node 14, 16, whether the node 14, 16 has a fault, whether the remaining power in the battery 22 is low, and so on.

The processing and control unit 26 receives signals indicative of timing and location data from a GPS antenna 32 and generates time reference data which governs the time at which samples of the survey data or the transmitter current are taken.

The processing and control unit 26 includes a processor 46, and a timing unit 48 in operative communication with the GPS antenna 32 and arranged to generate the time reference data using the signals received from the GPS antenna 32.

In the case of a data acquisition unit 14, the time reference data is used to control the times at which samples of gathered survey data received from the sensors 15 are taken. In the case of a transmitter control unit 16, the time reference data is used to control the times at which samples of the transmitter current are taken. By associating the time reference data with the samples of the received survey data and the samples of the transmitter current, the system 10 is able to accurately synchronise the transmitter current with the received survey data.

The processing and control unit 26 also includes a data storage device 54 arranged to store survey data received from sensors 15 connected to the data acquisition unit 14 or to store transmitter current data received from the transmitter 18, depending on whether the node is a data acquisition unit 14 or a transmitter control unit 16. The data storage device 54 is also used to store programs for controlling operation of the node 14, 16. In the present example, the data storage device 54 is in the form of a FLASH memory The processor 46 is arranged to control and coordinate all operations in the node 14, 16 in accordance with programs stored in the data storage device 54. It will be understood that the programs may be pre-stored on the data storage device 54 prior to deployment of the nodes on-site, or the programs may be transferred to the nodes as part of the deployment process by connecting a computing device to the node 14, 16 using the input-output interface 36 and transferring the programs to the node 14, 16 for storage on the data storage device 54. Such programs may in addition or alternatively be located on a separate computing device to which the survey data is to be transferred for analysis.

The transferred programs are arranged to cause appropriate time reference data to be generated using signals received from the GPS antenna 32, and to associate the time reference data with the survey data samples or with the transmitter current data samples depending on whether the node operates as a data acquisition unit 14 or a transmitter control unit 16.

In the case of a data acquisition unit 14, the stored programs are also arranged to cause the processor 46 to process survey data received from sensors 15 so as to generate processed survey data of reduced volume and reduced noise relative to the received survey data and which is in a more useful format. The processed survey data together with associated time reference data is stored on the data storage device 54. Processing functions may be carried out during and/or after data acquisition.

The stored programs may include programs arranged to detect the presence of a transient interference event such as an atmospheric discharge (lightning) or a surge on a power transmission line. Software enables a decision to be made as to which data has been affected by the transient interference and, for the data which has been affected, a best guess of the true data for the relevant sample period is generated to replace the affected data. This is achieved by carrying out a plurality of data gathering operations in a survey with each data gathering operation involving activation of the transmitter current and gathering of data samples on deactivation of the transmitter current, and comparing each sample of a particular data gathering operation with a corresponding sample of a subsequent or previous data gathering operation, or with a corresponding average sample value of a plurality of corresponding samples taken during a plurality of data gathering operations. Since it is expected that the corresponding samples should differ only slightly from each other, if some of the sample values differ significantly from a previous, a subsequent or an average sample value, the software may be arranged to ignore the affected part of the survey data or to ignore all data gathered during the particular data gathering operation during which the affected survey data was present.

The stored programs may include a stacking program arranged to increase the signal-to-noise ratio by carrying out selective tapered stacking as a method of averaging long series of raw data into smaller series in order to reduce the effects of interference and to reduce the data volume. Stacking is achieved by averaging a sample over a large number of repeat samples, that is, over a large number of data gathering operations. Repetitive data is significantly enhanced at the expense of non-repetitive data. The stacking program may be arranged such that the contribution to the stacked data by each element of the raw data varies depending on an assessment made by algorithms in the programs as to the quality of the elements. For example, if one or more samples are affected by a transient interference event, the identified samples may be ignored by the stacking program.

The stored programs may also include a windowing program arranged to increase the signal-to-noise ratio by averaging a number of consecutive samples taken from each sensor during a data gathering operation so as to produce a single representative sample value for the consecutive samples.

It will be understood that by carrying out selective tapered stacking and/or by averaging a number of consecutive samples, it is possible to reduce the noise associated with received survey data to levels of the order of 1 nV/A or less.

The stored programs may also include programs arranged to generate and continuously update estimates of the incoming interference from all sources such as power transmission lines, BLF transmitters, atmospheric sources, and so on. If harmonic interference is still detectable after stacking has taken place, the interference can be removed using a digital filter arranged to remove the affected parts of the spectrum and replace the affected spectrum with interpolated error-free spectra.

The degree of incoming interference may be detected in various ways. For example, two data gathering operations may be carried out with transmitter currents of opposite polarity and the responses added together so as to produce a representation of the noise only.

Any harmonic interference which is present in the survey data is in most cases relatively easy to detect as the frequency of the harmonic interference is generally at a different frequency to the frequency used for the transmitter 18. For example, harmonic interference caused by power lines is generally at 50 Hz and can therefore be removed from the survey data by any appropriate filtering technique, such as digital filtering.

The stored programs may also include a drift detector program arranged to detect a drift in relative timing between the node and the transmitter by cross-correlating a measurement at a site with a previous measurement obtained at the time of deployment of the node at the site. Using this detection, timing drift can be corrected.

The stored programs may also include programs arranged to cause the processor 46 to convert waveforms corresponding to the received survey data into the frequency domain using Fourier transform analysis, and to convert data into meaningful units.

The stored programs may also include programs arranged to carry out deconvolutions in order to remove the effects of various phenomena which may occur during the survey, such as variations in transmitter waveforms and sensor properties for example caused by a gradual decrease in power supplied by the battery 22.

The stored programs may also include programs arranged to calculate quality control indicators for use in assessing the quality of the received survey data. For example, the programs may be arranged to calculate standard deviation values for the survey data and, using noise indicators for example derived from the above described estimate of the noise present, to make a determination as to whether and/or which noise reduction process is necessary.

The stored programs may also enable the processor 46 to make decisions in isolation concerning parameters associated with survey data acquisition and processing. For example, the programs may enable the processor 46 to make decisions on the level of gain to apply to received survey data by analysing the magnitude of the survey data samples and adjusting the level of gain applied to the samples so as to prevent saturation of the amplifiers 60 during use.

Each of the nodes includes a multi-tasking operating system such as Linux which enables the node to carry out several functions simultaneously. While acquiring data, the node can be interrogated, for example using a hand-held computing device, in order for an operator to carry out quality control of the performance of the node. Interrogation of the nodes can be carried out without interrupting the acquisition and processing of data being performed by the nodes. Operators are able to download from the node any data stored in the data storage device 54, including information indicative of the quality of any data stored in the data storage device 54. In this example, transfer of data between a node and the hand-held computing device takes place via the infra red interface provided on the node and a corresponding infra red interface provided on the hand-held computing device, although it will be understood that the transfer may take place in any other suitable way, for example via the serial interface or via a network interface.

The computing device to which data is transferred from the nodes may include stored programs arranged to carry out processing operations on the survey data received from the nodes. Since fixed loop EM data can be treated like geomagnetic or gravity data in that it can be represented by potential field equations, it is possible to extrapolate the data so as to provide estimates of the magnetic field above or below the surface of the survey area. For example, it is possible to interpolate the magnetic field so as to enhance detail of target elements located below the surface of the survey area. The interpolation process uses spatial derivatives derived between sensors disposed on the surface of the survey area to derive spatial derivatives in a vertical direction.

The stored programs are also arranged to process the received surveyed data samples from the sensors so as to reduce noise of the type caused by atmospheric discharges and telluric currents. Such noise is generally relatively constant over a desired survey area.

In order to separate such noise from the survey data, the stored programs are arranged to calculate the difference between simultaneous samples from adjacent sensors and to divide each difference value by the distance between the relevant sensors. This is equivalent to taking a spatial derivative over the survey data.

Figure 4:
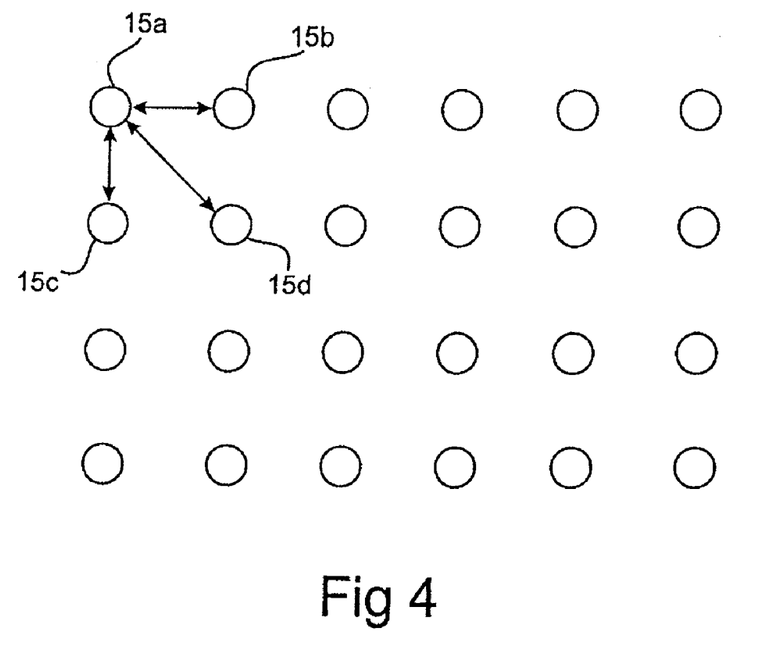
FIG. 4 is a diagrammatic representation of an array of data acquisition units deployed in a survey area during use.

A representation of an array of data acquisition units 14 disposed on a survey site is shown in FIG. 4.

It will be understood that calculations of spatial derivatives may be taken between sensors 15 disposed along a line in a first direction, for example between first and second sensors 15a and 15b respectively, between sensors 15 disposed along a second line orthogonal to the first line, such as between first and third sensors 15a and 15c respectively, and/or between sensors disposed generally diagonally relative to each other, such as between first and fourth sensors 15a and 15d respectively. The important aspect is that for each sensor 15 spatial derivatives may be taken between the sensor 15 and any number of adjacent sensors 15.

It will be understood that by calculating spatial derivatives in this way, it is possible to derive processed survey data which is virtually free of noise caused by atmospheric discharges, telluric currents, and the like.

In some situations, it is not practically possible to calculate derivatives simultaneously over an entire survey area because a large number of sensors 15 and associated data acquisition units 14 would be required and an insufficient number of data acquisition units 14 and sensors 15 are available. With such a situation, operators are required to move the available array of data acquisition units and sensors several times in order to cover the entire survey area. However, since all proposed locations in the survey area for the sensors 15 are not simultaneously occupied by the sensors 15, it is not possible to directly calculate all possible spatial derivatives for each sensor location instantaneously.

Figure 5A:
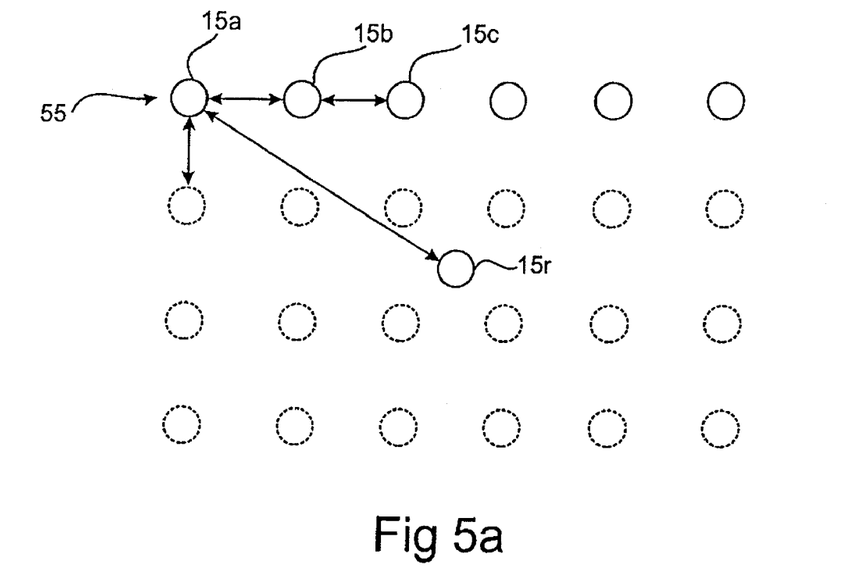
FIGS. 5a and 5b are diagrammatic representations illustrating a method of using a relatively small number of data acquisition units to carry out a survey over a relatively large survey area.
Figure 5B:
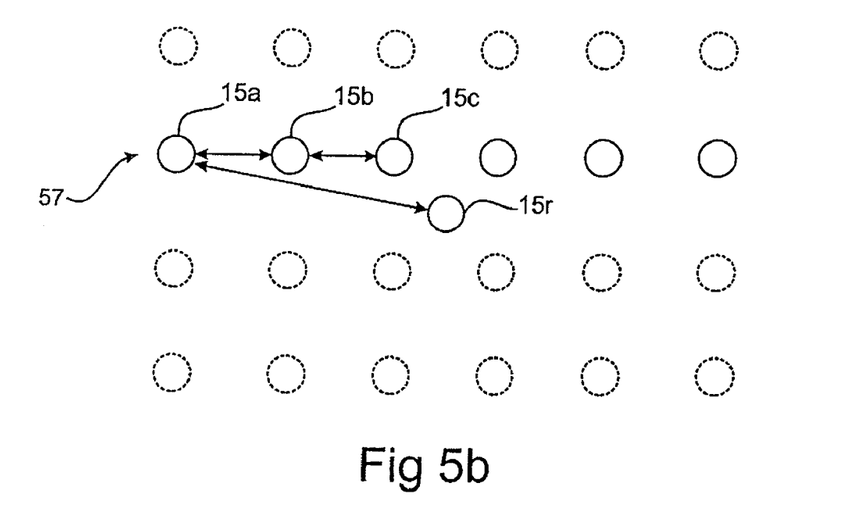

In order to obtain spatial derivatives for all sensor locations, a reference data acquisition unit and associated reference sensor 15r may be used, as shown in FIGS. 5a and 5b. In the present example, the reference sensor 15r is disposed generally centrally of the proposed survey area, although this is not necessarily the case.

As indicated in FIG. 5a, in order to cover an entire survey area, a first line 55 of data acquisition units 14 and associated sensors 15 are first disposed in the survey area. Instantaneous spatial derivatives are then taken simultaneously between adjacent nodes in the first line 55, such as between first and second sensors 15a and 15b respectively, between second and third sensors 15b and 15c respectively and between each of the sensors in the first line 55 and the reference sensor 15r. The sensors 15 in the first line 55 are then moved so as to be disposed in a second line 57, and simultaneous spatial derivatives between adjacent sensors 15 in the second line 57 and between each sensor 15 in the second line 57 and the reference sensor 15r are taken. In order to calculate the instantaneous spatial derivative between a sensor 15 when placed in the first line 55 and an adjacent sensor 15 when placed in the second line 57, the spatial derivative calculated relative to the reference sensor 14r when a sensor is in the second line 57 is subtracted from the spatial derivative calculated relative to the reference sensor 14r when the sensor is in the first line 55. This provides a spatial derivative corresponding to a simultaneous spatial derivative calculated between a sensor disposed in the first line 55 and an adjacent sensor disposed in the second line 57.

Since all the spatial derivatives for the whole survey are not actually derived from survey data gathered simultaneously, it may be necessary to correct the survey data for any variations which may occur as a result of variations in transmitter current which may occur between different sensor locations. The reference data acquisition unit 14 may be used to facilitate correction of variations in the survey data by continuously measuring the survey data obtained by the reference node during the whole survey.

It will be understood that in order to correct for small variations in sensitivity of the sensors 15 and the data acquisition units 14 prior to carrying out a survey, the sensors 15 and data acquisition units 14 should be calibrated in order to correct for variations caused by differences in orientations of the sensors and sensitivity of the sensors and data acquisition units.

In the present example, this is achieved by collecting survey data in response to a distant signal source that is only slowly spatially varying over the survey area or not varying at all. For example, noise caused by distant atmospheric discharges may be used as the signal source and survey data collected in the absence of a transmitter current. Given the relatively small spatial separation of sensors in the survey area, it can be expected that the response at each sensor will be well correlated between all sensors. For a given survey area, a correction co-efficient may be associated with each sensor or, in the case of multiple component sensors, a vector or tensor may be associated with each sensor.

The stored programs may also be arranged to integrate the survey data so as to achieve potentially cleaner conventional data. An integration constant may be added which may be derived using the reference data acquisition unit and associated reference sensor.

Figure 6:
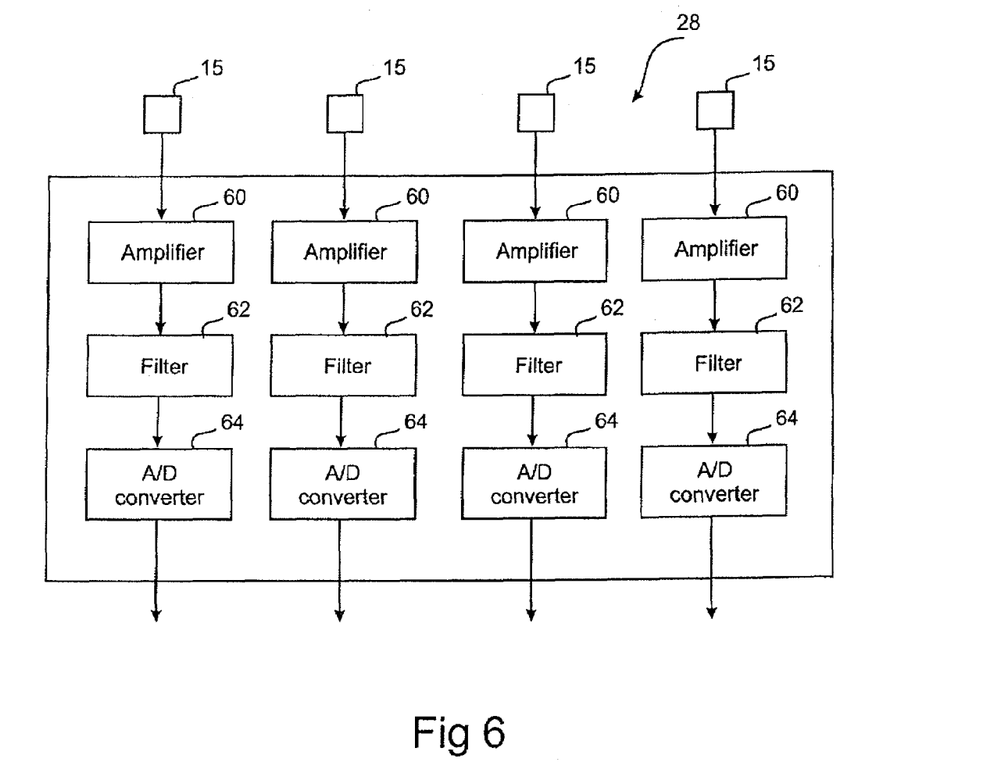
FIG. 6 is a block diagram of an interface unit of the data acquisition unit shown in FIG. 3.

The analogue interface unit 28, shown more particularly in FIG. 6, includes circuitry for four different signal channels, each channel including an amplifier 60 which receives survey data from a sensor 15 or from a transmitter 18 depending on whether the node is a data acquisition unit 14 or a transmitter control unit 16. The filtered data is then passed to a low-pass filter 62 and an A/D converter 64, in this example a 24-bit converter.

Control of the amplifiers 60, filters 62 and the A/D converters 64 including clocking of the A/D converters 64 and thereby sampling of the received survey data or the transmitter current, is carried out by the processing and control unit 26.

The protection unit 30 includes a separate protection circuit for each channel, each protection circuit serving to protect the circuitry of the analogue interface unit 28 from damage due to large voltage transients which may be present on the signals input to the protection unit 30.

The nodes 14, 16 may also be provided with an accurate oscillator, in this example an oven-controlled crystal oscillator (OCXO), useable by the timing unit 48 to generate time reference data when a GPS signal is unavailable. The crystal oscillator produces an accurate frequency signal which is used by the timing unit 48 to generate time reference data. In this example, the time reference data is the output of a counter arranged to count the number of cycles of the signal produced by the crystal oscillator. However, with this arrangement, since each node 14, 16 includes a separate crystal oscillator, if a GPS signal is unavailable it is necessary to periodically synchronise the crystal oscillators with each other during the course of a survey. In practice, this is achieved by providing the transmitter control unit 16 with a high precision crystal oscillator, by providing each data acquisition unit 14 with a precision crystal oscillator, and by periodically connecting each data acquisition unit 14 with the transmitter control unit 16 through the input/output interface 36 so as to compare the frequency of the high precision crystal oscillator with the frequency of the precision oscillator and to compare the phasing of the counter in the data acquisition unit with the phasing of the counter in the transmitter control unit 16. Any discrepancy between the frequencies and counters is removed by adjusting the frequency of the precision crystal oscillator and by adjusting the phasing of the counter associated with the precision crystal oscillator.

When a GPS signal is unavailable for an extended period of time of the order of several hours or more, there is a possibility that the time reference data derived from the oscillator will drift. During a survey with an active source, the drift of a node's time reference data relative to the source primary field waveform can be monitored by a node whilst it is positioned at a particular location. The drift is calculated by cross-correlating a measurement at a particular time with a measurement taken at the time of deployment of the node at the location. Since it can be assumed that the drift is caused by a slow loss of synchronisation at the node, the drift can be corrected by modifying the frequency of the oscillator and phasing of the counter associated with the oscillator in accordance with the detected drift.

An example of a geophysical transient electromagnetic (TEM) survey using the above data acquisition system will now be described.

Operators first deploy one or more transmitter loops 12 at a suitable location for energising a desired survey area 80, and connect the transmitter 18 to a transmitter loop 12. A transmitter control unit 16 is connected to the transmitter 18 in order to control the transmitter 18 and to sample the current flowing through the transmitter loop 12.

Operators then distribute data acquisition units 14 around the desired survey area and connect each data acquisition unit 14 to one or more sensors 15, in this example coil-type sensors, by connecting the sensors 15 to the inputs of the protection unit 30.

When deployed, the data acquisition units 14 and the transmitter control unit 16 are switched on and programs residing in the data storage devices 54 of the data acquisition unit 14 cause the data acquisition units 14 to commence retrieving signals from the sensors 15, take samples of the signals, process the sampled signals, and record the processed signals. Similarly, the programs residing in the data storage device 54 of the transmitter control unit 18 cause the transmitter control unit 18 to control the transmitter 18, to commence retrieving signals from the transmitter, take samples of the retrieved transmitter signals, process the sampled signals, and record the processed signals. If necessary, the operators provide information to the data acquisition unit 14 and the transmitter control unit 16 to update the configuration of the units 14, 16 for the particular survey and the particular tasks to be carried out. In practice, the majority of settings for all units in a survey will be the same. The instructions given to update the configuration of the units 14, 16 include settings of the transmitter frequency, the rate at which processed survey data is to be stored in the data storage device 54, and other settings related to the processing of survey data. Instructions transferred to the units 14, 16 by an operator are transmitted via the input/output interface 36 using a portable computing device.

Using the same portable computing device and the input/output interface 36 of a data acquisition unit 14, an operator can view survey data from the data acquisition unit to verify its operation. Additionally, information provided to the operator via the LCD display 40 and the LED display 44 allows the operator to make a rapid assessment of the functioning of the data acquisition unit 14.

In the present example, the survey is a TEM type survey and the transmitter 18 and associated transmitter loops 12 are controlled by the transmitter control unit 16 so as to generate a magnetic field which decays over time. As a consequence, the samples of the survey data recorded by the sensors 15 reduce in magnitude with each successive sample.

When a transmitter loop 12 is operational, a primary magnetic field which decays over time is generated which passes through the survey area, including through the prospective sub-surface volume. Electrically conductive elements of the sub-surface volume respond to the primary fields by conducting electric currents. These currents flowing in the sub-surface themselves generate secondary electromagnetic fields that can be diagnostic of the geology of the sub-surface volume. Coil sensors disposed in the vicinity of the sub-surface volume detect the primary and secondary fields and generate survey data in the form of a voltage which reduces in magnitude over time, the voltage being fed to the analogue interface unit 28 via the protection unit 30 of a data acquisition unit 14. At the analogue interface unit 28, the voltage is amplified, filtered, converted to digital, and sampled using the time reference data. The processor 46 then processes the sampled survey data in accordance with the processing steps described above in order to increase signal-to-noise ratio and reduce the volume of data.

At pre-determined intervals governed by the programs and settings stored in the data storage device 54, processed survey data is stored in the data storage device 54 of each data acquisition unit 14. In addition to the survey data itself, time reference data indicative of the timing of samples, information indicative of the location of sensors, and any other information that is needed for processing of the survey data is recorded in the data storage device 54.

During the course of the survey, an operator visits each data acquisition unit 14 for the purpose of confirming correct operation of the units 14, 16. At this time, processed data or other forms of data may be downloaded from the data acquisition units via the input/output interface 36 to a portable computing device carried by the operator for the purpose of analysing data quality and collating data from the survey.

A survey may include one or more data gathering operations, that is, one or more operations involving activation of the transmitter, deactivation of the transmitter and gathering of data samples as necessary.

When the survey has been completed, all survey data representative of sensor responses and the current flowing through the transmitter loop 12 is transferred to a portable computing device from the units 14, 16. It will be appreciated that since the received survey data is processed by the processor 46 so as to reduce the volume of survey data, only a relatively small and inexpensive data storage device is required in each data acquisition unit 14 and only a relatively short time is required to collect and collate data from all data acquisition units. The portable computing device then processes the survey data so as to generate spatial derivatives and so as to carry out any other desired processing actions.

It will also be appreciated that since the received survey data is stored at the nodes 14, 16 for subsequent downloading and analysis after completion of the survey, and since the nodes 14, 16 generate time reference data for the received survey data either through GPS or through a local crystal oscillator, the nodes are effectively autonomous, and cumbersome and expensive cabling between the nodes 14 and the central computing device and/or a timing device is not necessary.

Figure 7:
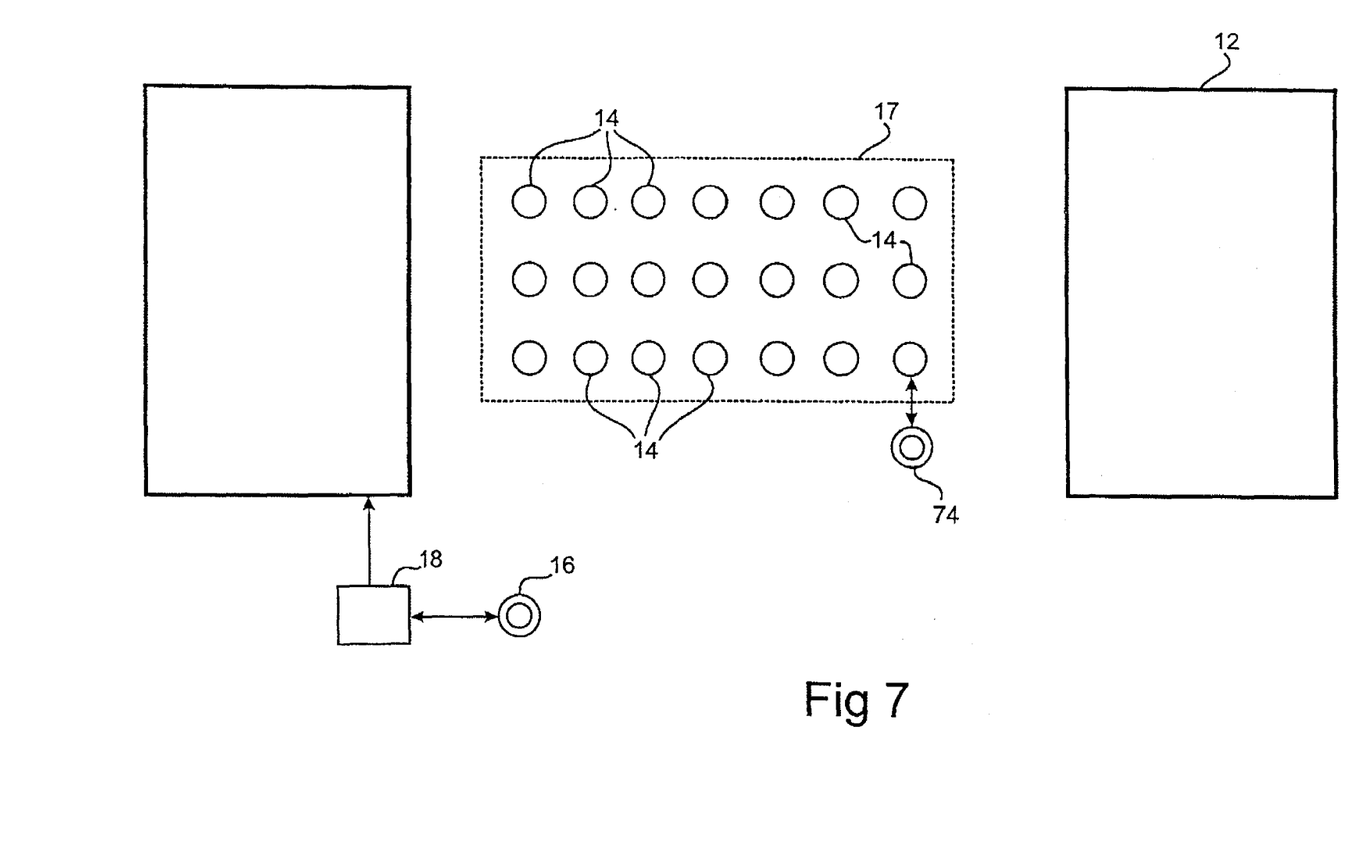
FIG. 7 is a block diagram of a data acquisition system in accordance with an alternative embodiment of the present invention.

A data acquisition system 70 in accordance with an alternative embodiment of the present invention is shown in FIG. 6

The alternative system 70 is suitable for use in areas where GPS in not available. Like features are indicated with like reference numerals.

The alternative system 70 includes a roving node 74 which serves to maintain synchronisation between the received survey data and the transmitter 18.

The transmitter control unit 16 and the roving node 74 include a high precision oven-controlled crystal oscillator and each of the data acquisition units 14 include a less expensive precision oven-controlled crystal oscillator.

In operation, an operator periodically connects the roving node 74 to each data acquisition unit 14 via the input/output interface 36 so as to synchronise the precision crystal oscillators in the data acquisition units 14 with the high precision crystal oscillators in the roving node 74.

With this embodiment, instead of the data acquisition units 14 receiving instructions from a portable computing device, the data acquisition units 14 may receive instructions from the roving node 74 when the roving node 74 is connected to the data acquisition units 14.

Modifications and variations as would be apparent to a skilled addressee are deemed to be within the scope of the present invention.

The invention claimed is:

1. A data acquisition system for gathering geophysical data, said system comprising:
at least one data acquisition unit connectable to a plurality of sensors and being arranged, during use, to simultaneously gather geophysical data from the sensors, the at least one data acquisition unit comprising time referencing means arranged to generate time reference data usable to control the time at which samples of geophysical data are taken; and
means for calculating spatial derivatives between simultaneous samples associated with adjacent sensors that are connected, during use, to the at least one data acquisition unit.

2. The data acquisition system as claimed in claim 1, wherein the time referencing means comprises a GPS receiver.

3. The data acquisition system as claimed in claim 1, wherein the time referencing means comprises an accurate oscillator.

4. The data acquisition system as claimed in claim 3, wherein the accurate oscillator comprises a precision oven controlled crystal oscillator, and the time referencing means further comprises a counter arranged to count signals generated by the crystal oscillator.

5. The data acquisition system as claimed in claim 3, wherein the data acquisition unit is arranged to receive synchronisation signals useable to adjust a frequency of the oscillator and thereby adjust the times at which samples of geophysical data are taken so that the times at which samples of geophysical data are taken are synchronised with the times at which samples of geophysical data are taken in other data acquisition units.

6. The data acquisition system as claimed in claim 1, wherein the data acquisition unit is arranged to receive and store programs for subsequent execution.

7. The data acquisition system as claimed in claim 1, wherein the data acquisition unit is arranged to calculate an average sample value for a plurality of corresponding repeat sample values when a plurality of data gathering operations are carried out as part of a geophysical survey so as to reduce an effect of interference on the samples and reduce the quantity of data.

8. The data acquisition system as claimed in claim 7, wherein the data acquisition unit is arranged to compare repeat samples and to discard samples which differ by a predetermined amount from a majority of the repeat samples.

9. The data acquisition system as claimed in claim 1, wherein the data acquisition unit is arranged to calculate an average sample value for a plurality of consecutive samples taken during a data gathering operation carried out as part of a geophysical survey so as to produce a representative sample for the consecutive samples.

10. The data acquisition system as claimed in claim 1, wherein the data acquisition unit is arranged to estimate the amount of interference present at a survey site.

11. The data acquisition system as claimed in claim 10, wherein the amount of interference present is estimated by carrying out a first data gathering operation with an incident magnetic field of a first polarity so as to produce a first response, carrying out a second data gathering operation with an incident magnetic field of a second polarity so as to produce a second response, and calculating a sum of the first and second responses so as to cause the first and second responses to cancel out.

12. The data acquisition system as claimed in claim 1, wherein the data acquisition unit is arranged to filter gathered geophysical data so as to remove periodic interference.

13. The data acquisition system as claimed in claim 1, wherein the data acquisition unit is arranged to convert gathered geophysical data into frequency domain using Fourier transform analysis.

14. The data acquisition system as claimed in claim 1, wherein the data acquisition unit is arranged to generate at least one quality control indicator for use in assessing a quality of the gathered geophysical survey data.

15. The data acquisition system as claimed in claim 14, wherein the data acquisition unit is arranged to calculate a standard deviation value for the gathered geophysical survey data.

16. The data acquisition system as claimed in claim 14, wherein the system is arranged to correct for a variation in magnitude of the gathered geophysical data caused by a variation in power supplied to the energy source.

17. The data acquisition system as claimed in claim 1, wherein the data acquisition unit is arranged to adjust a level of gain applied to gathered geophysical survey data based on an assessment of a magnitude of the gathered geophysical survey data.

18. The data acquisition system as claimed in claim 1, wherein the data acquisition unit is arranged to downward extrapolate gathered geophysical survey data so as to enhance detail of a target located below a surface of a survey area.

19. The data acquisition system as claimed in claim 1, wherein the data acquisition unit is connectable to an energy source, the data acquisition unit is arranged to gather energy source output data from the energy source, and the time referencing means is arranged so as to sample the gathered energy source output data.

20. The data acquisition system as claimed in claim 19, wherein the system is arranged to correct for variations in magnitude of the energy source output during a geophysical survey.

21. The data acquisition system as claimed in claim 1, further comprising at least one interface arranged to facilitate transfer of geophysical data and/or programs to or from the data acquisition unit.

22. The data acquisition system as claimed in claim 21, wherein the data acquisition unit comprises a multi-tasking operating system.

23. The data acquisition system as claimed in claim 22, wherein the data acquisition unit is arranged to facilitate transfer of geophysical data from the data acquisition unit during a geophysical survey.

24. The data acquisition system as claimed in claim 21, wherein the interface comprises at least one of an infra red interface, a serial interface, and a network interface.

25. The data acquisition system as claimed in claim 1, wherein the data acquisition unit is arranged to store a correction coefficient for each sensor connected during use to the data acquisition unit, each correction coefficient being used to correct for variations in sensor sensitivity.

26. The data acquisition system as claimed in claim 1, further comprising display means arranged to provide information indicative of operation of the data acquisition unit to an operator.

27. The data acquisition system as claimed in claim 1, wherein the data acquisition unit includes the means for calculating spatial derivatives.

28. The data acquisition system as claimed in claim 1, wherein the means for calculating spatial derivatives is separate from the data acquisition unit.

29. The data acquisition system as claimed in claim 28, further including a portable computing device, the portable computing device including the means for calculating spatial derivatives.

30. The data acquisition system as claimed in claim 1, comprising a plurality of data acquisition units.

31. The data acquisition system as claimed in claim 1, further comprising:
at least one reference data acquisition unit, each reference data acquisition unit being connectable to at least one reference sensor and being arranged, during use, to gather geophysical data from the at least one reference sensor, and to take samples of the geophysical data gathered from the at least one reference sensor;
wherein the means for calculating spatial derivatives between samples associated with adjacent sensors is arranged to calculate first spatial derivatives between at least some of the sensors and the at least one reference sensor connected to the reference data acquisition unit during a first data gathering operation when the sensors are disposed in a first location, to calculate second spatial derivatives between at least some of the sensors and the at least one reference sensor connected to the reference data acquisition unit during a second data gathering operation when the sensors are disposed in a second location, and to calculate a difference spatial derivative between the first and second spatial derivatives, each said difference spatial derivative being indicative of a spatial derivative between a sensor disposed in a first location and a sensor disposed in a second location.

32. The data acquisition system as claimed in claim 31, further comprising means for calculating an integral of the spatial derivatives.

33. The data acquisition system as claimed in claim 31, further comprising an energy source arranged to generate and direct energy towards a sub-surface volume so as to cause a geophysical response and thereby cause generation of the geophysical signals.

34. The data acquisition system as claimed in claim 33, wherein the energy source includes a transmitter and a transmitter loop.

35. The system as claimed in claim 33, wherein the system is arranged to correct variations in the energy source using the reference data acquisition unit and associated reference sensor.

36. The data acquisition system as claimed in claim 31, further comprising an energy source control unit connectable to the energy source and arranged to gather output data from the energy source, the energy source control unit comprising time referencing means arranged to generate time reference data usable to control the time at which samples of the energy source output data are taken and to associate the energy source output data with the time reference data.

37. The data acquisition system as claimed in claim 36, wherein the energy source control unit is a transmitter control unit arranged to control a transmitter so as to energise a transmitter loop in accordance with a predetermined frequency.

38. The data acquisition system as claimed in claim 36, wherein the energy source control unit includes the same components as the data acquisition unit so that the transmitter control unit is capable of carrying out the functions of the data acquisition unit and vice versa.

39. A method of acquiring geophysical data, said method including the steps of:
  providing at least one data acquisition unit arranged to simultaneously gather geophysical data from a plurality of sensors connected in use to the at least one data acquisition unit;
  connecting the plurality of sensors to the at least one data acquisition unit;
  generating at the data acquisition unit time reference data usable to control the time at which gathering of samples of geophysical data are taken;
  calculating spatial derivatives between simultaneous samples associated with adjacent sensors that are connected, during use, to the at least one data acquisition unit;
  using the calculated spatial derivatives to derive geophysical data, and
  providing each data acquisition unit with display means for providing information indicative of operation of the data acquisition unit to an operator.

40. The method of acquiring geophysical data as claimed in claim 39, further comprising the steps of:
  providing at least one reference data acquisition unit arranged, during use, to gather geophysical data from at least one reference sensor;
  connecting each of the at least one reference data acquisition unit to at least one of the at least one reference sensors;
  calculating first spatial derivatives between at least some of the sensors connected to the data acquisition units and the at least one reference sensor connected to the at least one reference data acquisition unit during a first data gathering operation when the sensors are disposed in a first location;
  calculating second spatial derivatives between at least some of the sensors connected to the data acquisition units and the at least one reference sensor connected to the at least one reference data acquisition unit during a second data gathering operation when the sensors are disposed in a second location; and
  calculating a difference spatial derivative between the first and second spatial derivatives, each said difference spatial derivative being indicative of a spatial derivative between the first location and the second location.

41. The method as claimed in claim 39, further comprising means for calculating an integral of the spatial derivatives.

42. The method as claimed in claim 39, wherein the step of generating time reference data comprises the step of providing a GPS receiver.

43. The method as claimed in claim 39, wherein the step of generating time reference data comprises the step of providing an oscillator.

44. The method as claimed in claim 43, wherein the oscillator comprises a precision oven controlled crystal oscillator, and the step of generating time reference data further comprises the step of providing a counter arranged to count signals generated by the crystal oscillator.

45. The method as claimed in claim 43, further comprising the step of facilitating reception at the data acquisition unit of synchronisation signals useable by the processing means to adjust a frequency of the oscillator and thereby adjust the time at which samples of geophysical data are taken so as to synchronise the time at which samples of geophysical data are taken with the time at which samples of geophysical data are taken in other data acquisition units.

46. The method as claimed in claim 39, further comprising the steps of receiving and storing programs at the data acquisition unit for subsequent execution by the processing means.

47. The method as claimed in claim 39, further comprising the step of calculating an average sample value for a plurality of corresponding repeat sample values when a plurality of data gathering operations are carried out as part of a geophysical survey so as to reduce an effect of interference on the samples and reduce the quantity of data.

48. The method as claimed in claim 39, further comprising the step of comparing repeat sample values and discarding samples which differ by a predetermined amount from a majority of the repeat sample values.

49. The method as claimed in claim 39, further comprising the step of calculating an average sample value for a plurality of consecutive samples taken during a data gathering operation carried out as part of a geophysical survey so as to produce a representative sample for the consecutive samples.

50. The method as claimed in claim 39, further comprising the step of estimating the amount of interference present at a survey site.

51. The method as claimed in claim 50, wherein the amount of interference present is estimated by carrying out a first data gathering operation with an incident magnetic field of a first polarity so as to produce a first response, carrying out a second data gathering operation with an incident magnetic field of a second polarity so as to produce a second response, and calculating the sum of the first and second responses so as to cause the first and second responses to cancel out.

52. The method as claimed in claim 39, further comprising the step of filtering gathered geophysical data so as to remove periodic interference.

53. The method as claimed in claim 39, further comprising the step of converting gathered geophysical data into frequency domain using Fourier transform analysis.

54. The method as claimed in claim 39, further comprising the step of correcting for variations in magnitude of an energy source during a geophysical survey.

55. The method as claimed in claim 54, wherein the step of correcting for variations in magnitude includes the step of correcting for a variation in magnitude of the energy source caused by a variation in power supplied to the energy source.

56. The method as claimed in claim 54, further comprising the step of correcting variations in the energy source using the reference data acquisition unit and associated reference sensor.

57. The method as claimed in claim 39, further comprising the step of generating at least one quality control indicator for use in assessing the quality of the gathered geophysical survey data.

58. The method as claimed in claim 57, further comprising the step of calculating a standard deviation value for the gathered geophysical survey data.

59. The method as claimed in claim 39, further comprising the step of adjusting a level of gain applied to gathered geophysical survey data based on an assessment of the magnitude of the gathered geophysical survey data.

60. The method as claimed in claim 39, further comprising the step of downward extrapolating gathered geophysical survey data so as to enhance detail of a target located below a surface of a survey area.

61. The method as claimed in claim 39, wherein the method further comprises the step of facilitating transfer of processed geophysical data and/or programs to or from the data acquisition unit.

62. A data acquisition system for gathering geophysical data, said system comprising:
  at least one data acquisition unit connectable to a plurality of sensors and being arranged, during use, to simultaneously gather geophysical data from the sensors, the at least one data acquisition unit comprising time referencing means arranged to generate time reference data usable to control a time at which samples of geophysical data are taken; and
  a processor arranged to calculate spatial derivatives between simultaneous samples associated with adjacent sensors that are connected, during use, to the at least one data acquisition unit.

* * * * *